(12) United States Patent
Chu

(10) Patent No.: US 12,177,283 B2
(45) Date of Patent: Dec. 24, 2024

(54) INTEGRATED CONTROL OF VIDEO CONFERENCING ENDPOINTS

(71) Applicant: Logitech Europe S.A., Lausanne (CH)

(72) Inventor: Joseph Yao-Hua Chu, Los Gatos, CA (US)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 18/123,663

(22) Filed: Mar. 20, 2023

(65) Prior Publication Data

US 2024/0323247 A1    Sep. 26, 2024

(51) Int. Cl.
  *G06F 15/16*     (2006.01)
  *H04L 65/403*    (2022.01)
  *H04L 65/756*    (2022.01)

(52) U.S. Cl.
  CPC .......... *H04L 65/756* (2022.05); *H04L 65/403* (2013.01)

(58) Field of Classification Search
  None
  See application file for complete search history.

(56) References Cited

U.S. PATENT DOCUMENTS

| | | | |
|---|---|---|---|
| 2011/0316965 A1* | 12/2011 | Moore | H04L 12/1827 348/14.09 |
| 2016/0165184 A1* | 6/2016 | Aaron | H04L 12/1822 348/14.08 |
| 2018/0205767 A1* | 7/2018 | Vendrow | H04L 65/765 |

* cited by examiner

*Primary Examiner* — Wing F Chan
*Assistant Examiner* — Andrew Woo
(74) *Attorney, Agent, or Firm* — Patterson + Sheridan, LLP

(57) ABSTRACT

A system and method for providing an integrated system of endpoints are described, even though the endpoints are distributed over several locations. A distributed controller operates to link the endpoints together and provide a unified view of endpoints to a conference provider. In addition, the distributed controller can assign the workload of some endpoints to other endpoints that are better able to handle the workload. The distributed controller is implemented by cooperating processes in the endpoints.

23 Claims, 9 Drawing Sheets

INTEGRATED CONTROL OF VIDEO CONFERENCING ENDPOINTS

BACKGROUND

Field

Embodiments of the present disclosure generally related to video conferencing systems and, more particularly, to integrating geographically dispersed endpoints participating in video conferencing.

Description of the Related Art

Video conferencing has become more popular in recent years, thanks in large part to the proliferation of high-speed Internet and price reductions in camera equipment and other devices. For example, dedicated video conferencing locations exist where rooms and technological resources are dedicated solely to the task of video conferencing. Video conferencing environments typically include one or more multiple camera devices each of which provides a video stream. In some embodiments, multiple video streams from a first videoconferencing location can be sent to users at a second location that is remote from the first videoconferencing location. Sending multiple video streams to a remote location can be challenging when Internet bandwidth is limited. In some conventional applications, to overcome limited bandwidth, the quality of the video streams can be decreased, but the decreased quality of the video streams reduces the quality of the video conference.

Current video conferencing systems are not integrated. Current video conferencing systems also typically collect individual video streams from participants without change and send those individual streams to the participants without any adjustment to the composition of the set of individual streams. Typically, each of the received multiple video streams provided from different types of video conferencing devices to a remote video conferencing location is individually processed so that the information provided in the video stream is useable by a video conferencing software application before they are displayed, which is computationally intensive. For example, if a video conference has four participants, each participant receives independent video streams. Each participant receiving all of the video streams places a heavy load on the participant's viewing hardware and software.

It is desirable to integrate the collection of video streams collected from the participants and to integrate and compose the collection of video streams received by the participants.

SUMMARY

Described herein is a system and method for conducting video conferencing with multiple geographically-dispersed endpoints (cameras) in conjunction with a video conferencing provider.

Embodiments described herein provide a method for conducting a video conference. The method includes receiving endpoint capability information from each endpoint within a plurality of endpoints participating in a video conference, where each endpoint is in communication with the other endpoints within the plurality of endpoints. The method further includes determining the capabilities of at least one of the plurality of endpoints that are participating in a video conference, receiving, by the at least one of the plurality of endpoints, a plurality of streams of audio-video information of at least a portion of the video conference, where the audio-video information is adjusted based on the determined capabilities of the at least one of the plurality of endpoints based on the received endpoint capability information. The method further includes sending the adjusted audio-video information to a conference provider, receiving audio-video information from the conference provider, and transmitting the audio-video information received from the conference provider to an endpoint within the plurality of endpoints that are participating in the video conference.

Further embodiments include a computer-readable medium containing instructions for carrying out one more aspects of the above method and a system configured to carry out one or more aspects of the above method.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to a video conferencing system and related methods of using one or more electronic components within the video conferencing system. Embodiments of the video conferencing system and related methods disclosed herein have been developed to improve the experience of users of a video conferencing system by improving the video conference quality and efficiently locally processing and distributing one or more video streams to one or more conference room locations without consuming an excessive amount of bandwidth or computational power of one or more devices within an integrated or interconnected group of video conferencing devices. Embodiments of the disclosure provided herein also include the formation of a cluster of interconnected devices that are configured to share resources and reduce communication traffic based on knowledge gained from each of the devices with the cluster during normal video conferencing activities and communications. Thus, the embodiments of video conferencing systems disclosed herein enhance the functionality of an integrated or interconnected group of video conferencing devices without sacrificing quality or requiring the use of similar, dedicated, expensive, and complex video conferencing hardware at each videoconferencing location.

Figure 1A:
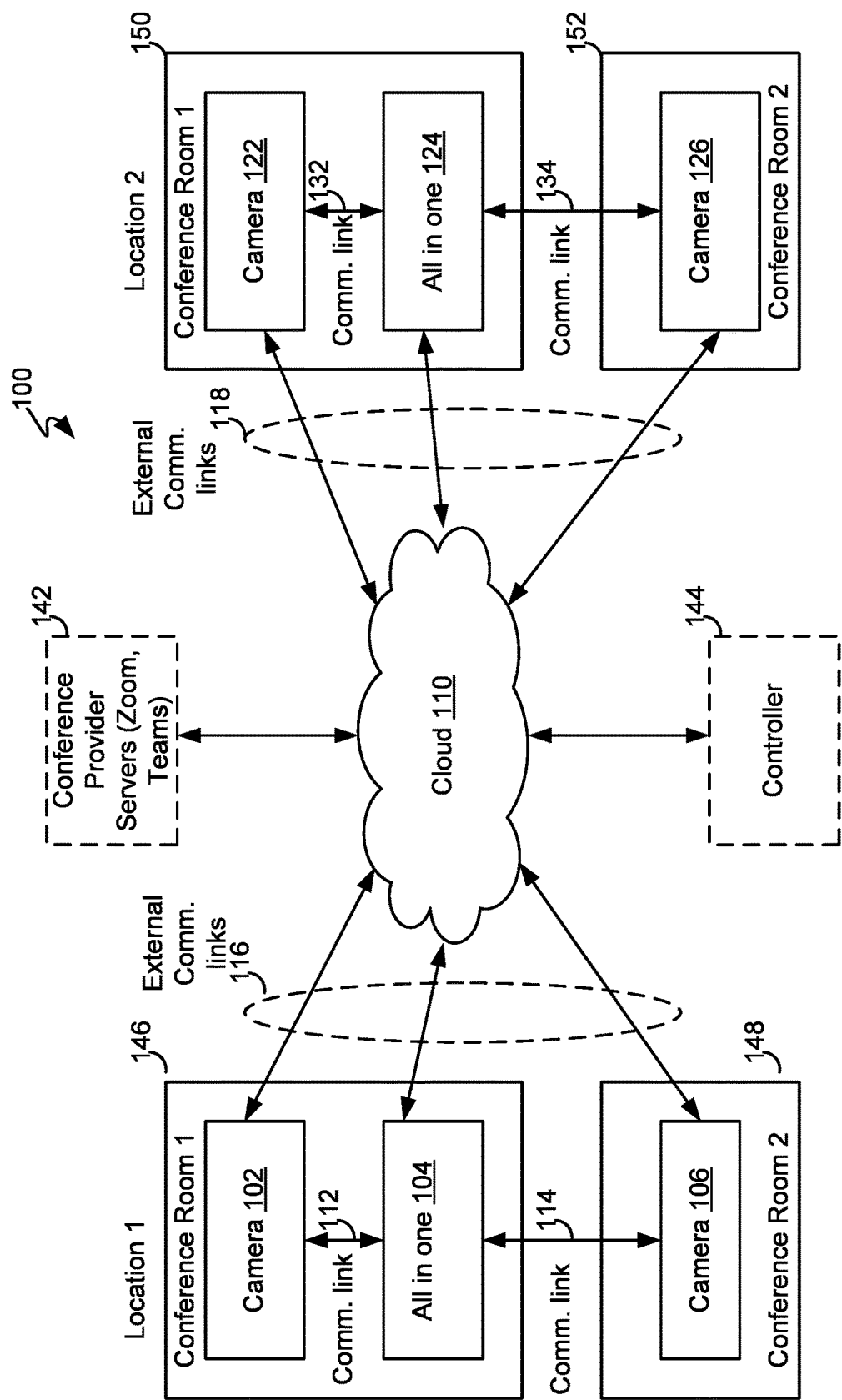
FIG. 1A depicts a video conferencing environment that includes video conferencing systems, according to one or more embodiments.

FIG. 1A is a schematic diagram of a video conferencing environment that includes a plurality of conferencing systems. The conference environment 100 includes two geographically separate locations, location 1 and location 2. Location 1 includes conference room 146 and conference room 148. Location 2 includes conference room 150 and conference room 152.

In location 1, conference room 146 includes multiple video conferencing devices. In one example, conference room 146 includes an endpoint 102, a highly capable endpoint 104, and a communication link 112 formed between them. In location 1, conference room 148 also includes one or more video conferencing devices, such as an endpoint 106 and a communication link 114 to one or more of the multiple video conferencing devices found in conference room 146. In some cases, highly capable endpoints can include devices, such as all-in-one types of endpoints that include a computer (e.g., processor, memory and software/program) and video conferencing hardware, which can include at least one of a camera, speaker and/or a microphone. In one example, an all-in-one includes a plurality of separate devices, such as Meetup™ device and computer, or Logitech Room Solution™, that are available from Logitech Europe SA, 7700 Gateway Blvd., Newark, CA 94560.

In location 2, conference room 150 includes multiple video conferencing devices. In the example illustrated in FIG. 1, conference room 150 includes an endpoint 122, a highly-capable camera system endpoint 124, and a communication link 132 formed between them. In location 2, conference room 152 also includes one or more video conferencing devices, such as an endpoint 126 and a communication link 134 to one or more of the multiple video conferencing devices found in conference room 150.

Figure 1B:
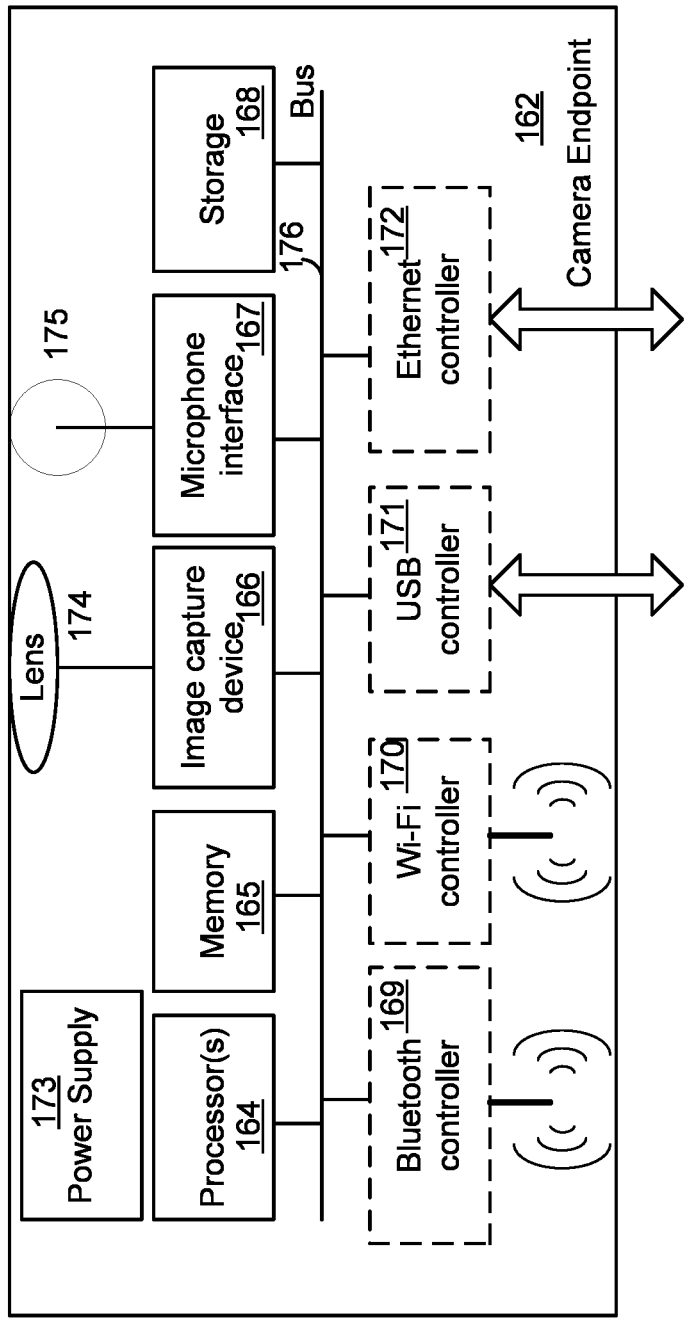
FIG. 1B depicts a camera endpoint that can be used in the video conferencing environment, according to one or more embodiments.

FIG. 1B depicts an example endpoint that can be used at one or more of the locations within the video conferencing environment. The endpoint 162 can include a processor or processors 164, memory 165 containing instructions for execution by the processor 164, an image capture device 166, such as a CCD, receiving images via a lens 174, a microphone interface 167 for receiving audio via microphone 175, non-volatile storage 168 for storing programs and data without subject to power loss, and one or more of a Bluetooth controller 169, a Wi-Fi controller 170, a USB controller and port 171, and an Ethernet controller and port 172. Thus, the endpoint device can be used as a camera and microphone device with various communication capabilities. The endpoint device is capable of running processes loaded into the memory from storage at speeds that depend on the speed of the processor 164.

The endpoint devices described in the example above and discussed further below are not intended to be limiting as to the scope of the disclosure provided herein since, in some embodiments, one or more of the video conferencing locations (e.g., location 1 or location 2) can include other types of electronic devices, more capable camera devices, display devices, and controlling devices. For example, one or more of the video conferencing endpoints 102, 104, 106, 122, 124, 126 could include or alternately include a wide-angle camera device, a pan and tilt camera device, multiple microphones, and an electronic display device (e.g., television, monitor, projection screen, a laptop, personal computer, tablet, smartphone, etc.). The video conference endpoints 102, 104, 106, 122, 124, and 126 may include other electronic devices that may be used in the video conference, such as an electronic whiteboard.

Figure 1C:
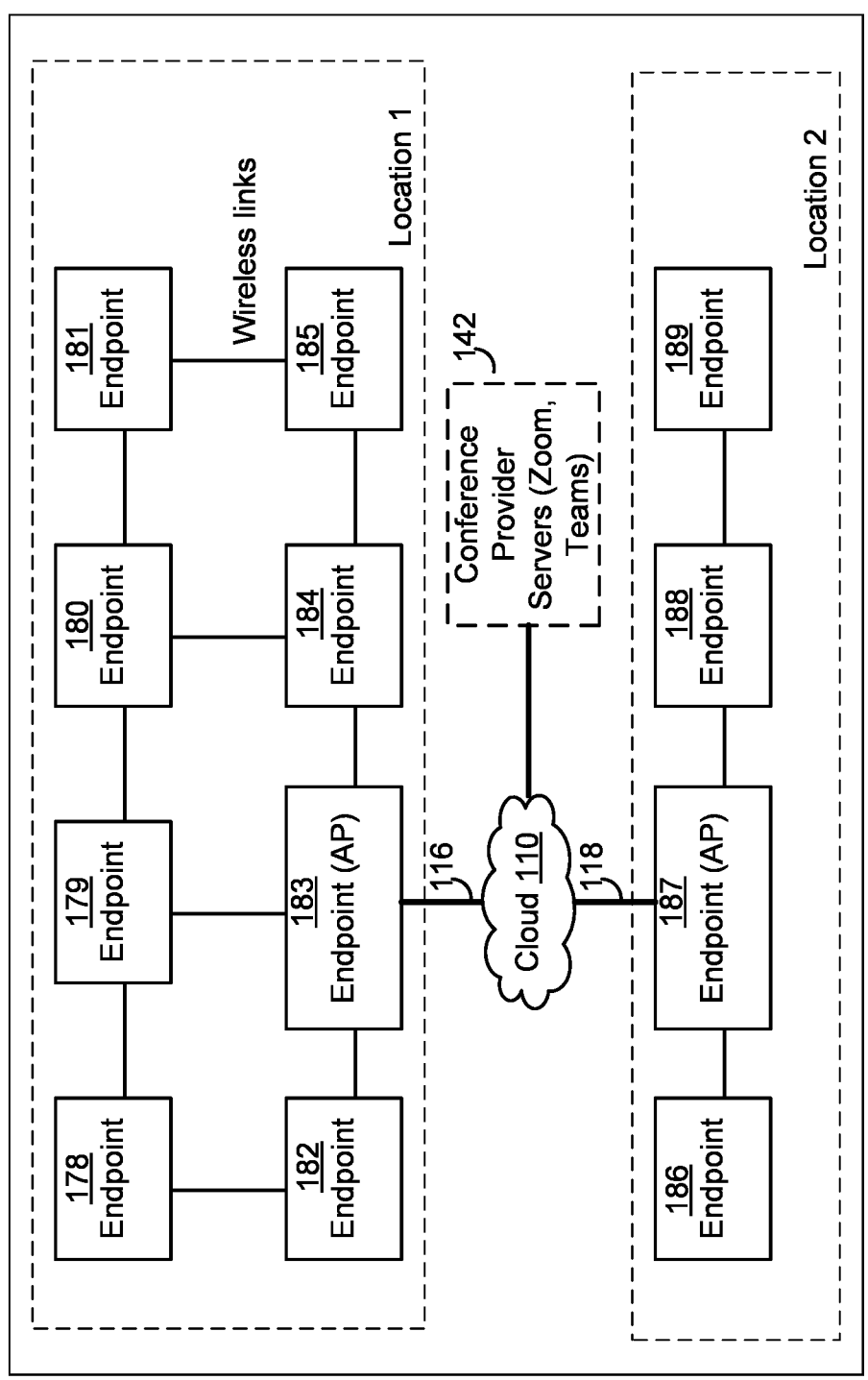
FIG. 1C depicts a network of camera endpoints in a location, according to one or more embodiments.

FIG. 1C depicts a network of camera endpoints in two locations. As shown in FIG. 1C, groups of endpoints, such as a first group of endpoints 178, 179, 180, 181, 182, 183, 184, 185 and a second group of endpoints 186, 187, 188, 189 in each location, are coupled to each other using only point-to-point links, such as Bluetooth, Ethernet or Wi-Fi. Thus, in each location, distant endpoints can directly communicate with each other or take multiple hops through other endpoints to connect to and communicate with each other. In addition, endpoints in one location are coupled to endpoints in another location via communication link and/or the conference provider 142, accessible via the cloud (i.e., a public network). One endpoint in each group, such as endpoint 183 and endpoint 187, operates as an access point (AP) for connecting to the conference provider 142 via the cloud 110. The conference provider may then communicatively link the different locations. An integrated system of devices at one or more locations, which may include the first group of endpoints 178, 179, 180, 181, 182, 183, 184, 185, or the second group of endpoints 186, 187, 188, 189, are individually referred to herein as a cluster, cluster of endpoints or mesh.

Figure 1D:
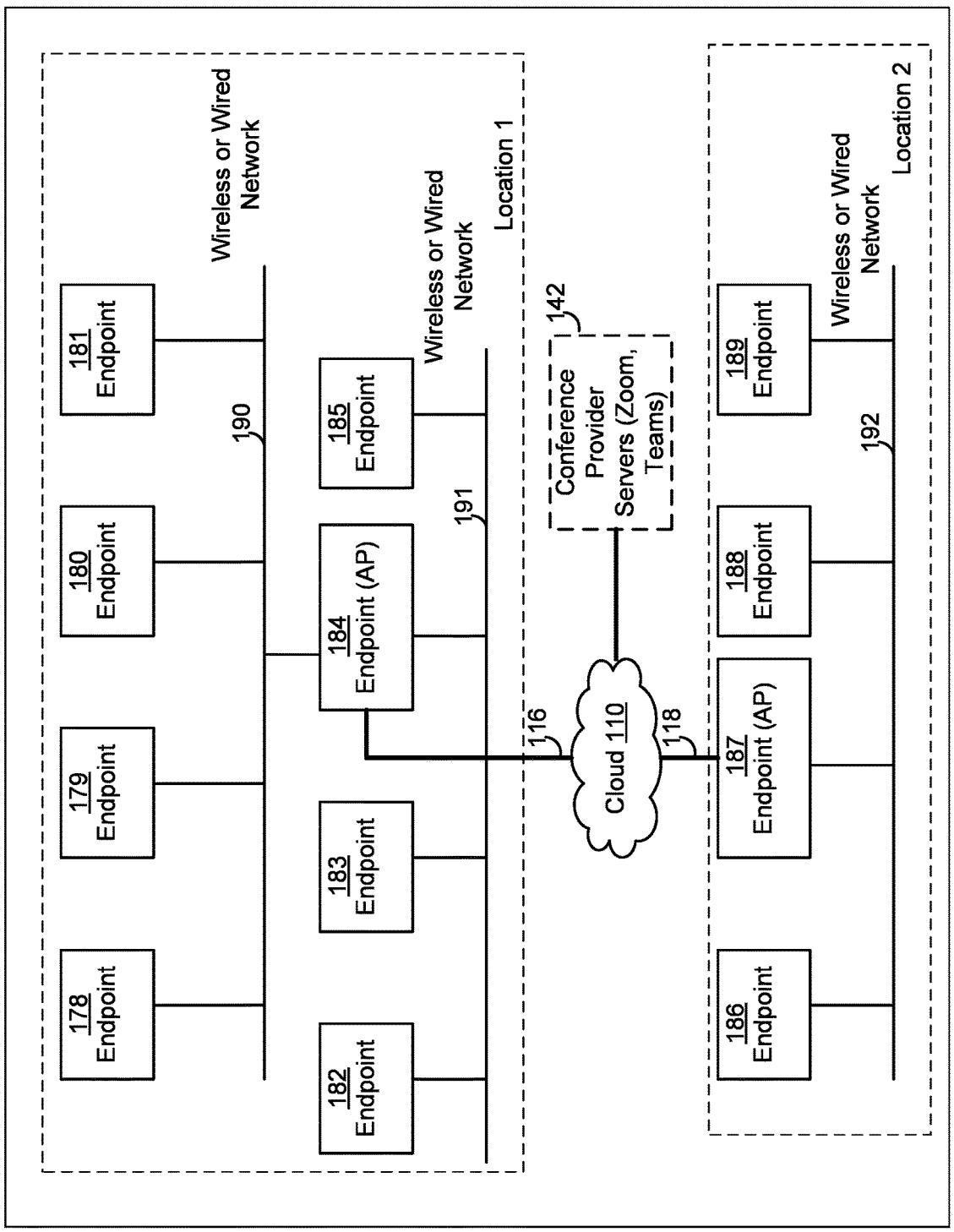
FIG. 1D depicts an alternative network of camera endpoints in a location, according to one or more embodiments.

FIG. 1D depicts a network of endpoints in two locations, in some embodiments. As illustrated in FIG. 1D, the first group of endpoints 178, 179, 180, 181, 182, 183, 184, 185 and the second group of endpoints 186, 187, 188, 189 in each location are connected to each other via a wired (Ethernet) or a wireless (Wi-Fi) network 190, 191, 192. One of the endpoints 184, 187 in each group can act as an access point connecting to an adjacent network. In addition, endpoints in one location are coupled to endpoints in another location via the conference provider 142, accessible via the cloud 110 (i.e., a public network). In some cases, the same endpoints, 184, 187, in each location are designated as an access point for connecting to the conference provider.

In the examples illustrated in FIGS. 1A-1D, each endpoint having communication facilities, such as one or more of Bluetooth, Wi-Fi, USB, and Ethernet, is capable of communicating with a cloud 110 by use of an external communication link 116 or 118 so that all of the endpoints can be coupled to and in some cases communicate with each other locally and/or through the cloud 110. The cloud 110 is also in communication with a system that can support a conference provider 142, such as Zoom or Microsoft Teams, and one or more distributed controllers 144 at each location, by which the endpoints coordinate their activities.

As briefly discussed above and is discussed in greater detail below, embodiments of the disclosure provided herein include the formation of a cluster of interconnected devices that are configured to share resources and reduce communication traffic based on capability and workload-related knowledge gained from each of the devices within the cluster during normal video conferencing activities and communications. In an effort to perform these functions, a distributed controller 144 is utilized by one or more of the endpoints within a local video conferencing environment to improve the video conferencing experience and/or determine the most efficient method of supporting a video conference activity. In some embodiments, the distributed controller 144 includes a software application or portion of software that resides in one or more of the endpoints. In general, the distributed controller 144 is utilized by at least one of the endpoints within a cluster of endpoints to control various activities performed before, during, and after a video conference is performed. In some embodiments, the distributed controller 144 acts as a decision-making arbiter that can reside within each endpoint and manages the various activities performed during the video conference. Thus, in some embodiments, the distributed controller 144 may be implemented as a peer-to-peer system or as a leader-follower system, with one endpoint designated as the leader, by using cooperating processes in some or all of the endpoints 102, 104, 106, 122, 124, 126, depending on the capabilities of those endpoints and/or in the conference provider. In addition, the conference provider may provide communicative links for carrying video and/or audio streams between the endpoints via cloud 110.

In some embodiments, each of the endpoints, by use of a communication link, is configured to provide information, such as metadata, within one or more video frames, a header associated with a video frame, or one or more of the audio packets in the audio stream to inform the receiving device (e.g., first endpoint) of the capability and/or workload of the transmitting device (e.g., second endpoint) so that the quality, efficiency and/or data processing capabilities of the overall cluster of endpoints at a local and/or distant video conferencing location can be enhanced and improved. In some embodiments, the metadata is incorporated in the video stream provided from an endpoint device such that the conference provider 142 ignores (i.e., side-banding) the presence of the metadata. Side-banding could use JSON data embedded into the video/audio stream. Having endpoints incorporate metadata into the video stream allows the endpoints to communicate with each other so that the endpoints can act as an integrated system controllable by the distributed controller 144.

Figure 2:
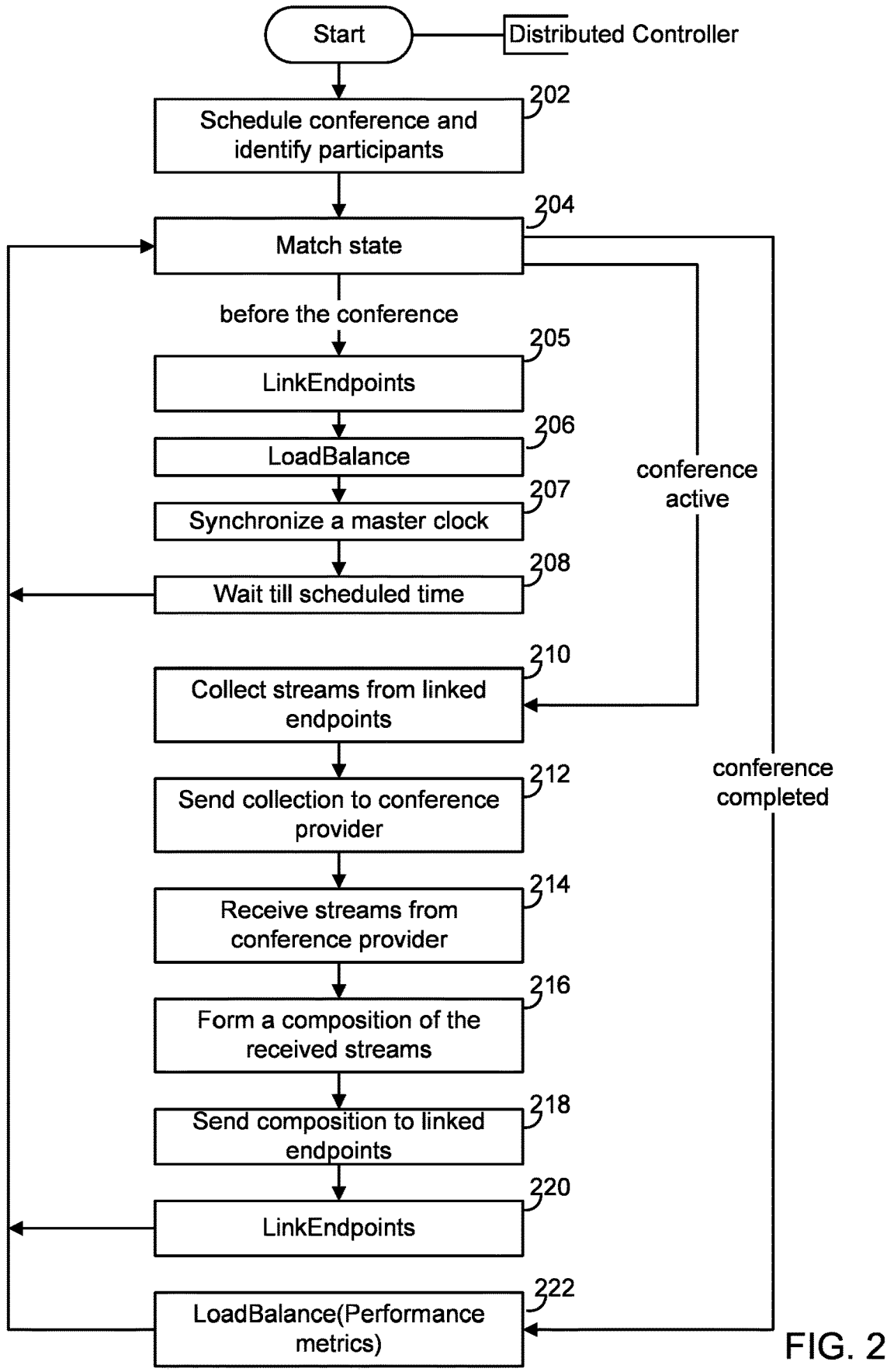
FIG. 2 depicts a flow of operations for a distributed controller, according to one or more embodiments.

FIG. 2 depicts a flow of operations for the distributed controller, in an embodiment. As mentioned above, the distributed controller 144 performs its operations using cooperative processes among several endpoints. In some embodiments, the endpoints may cooperate, via messages, to elect a leader endpoint that coordinates activities among other local endpoints and may move the leader endpoint to another endpoint in case of a failure or the presence of a more capable endpoint. In some embodiments, as noted above, the distributed controller 144 operates peer-to-peer (i.e., with no leader). The distributed controller 144 performs several functions, including the Link-Endpoints function (further described in reference to FIG. 3) and the Load-Balance function (further described in FIG. 4). In some embodiments, the distributed controller 144 is part of one or more local software programs running on one or more of the endpoints disposed within a group or cluster at each of the video conferencing locations. In some embodiments, the distributed controller 144 resides within a software application running on each of the endpoints. Alternatively, the functions performed by the distributed controller 144 are instead performed by software running on a dedicated electronic device, such as a server, that is in communication with one or more of the endpoints.

Referring to FIG. 2, in step 202, the distributed controller 144 learns of a scheduled conference and its participants. In some embodiments, the distributed controller 144 learns of a scheduled conference and who has been asked to attend by use of a calendar program running on an endpoint or an electronic device (e.g., smartphone, laptop, tablet, etc.) that is in communication with one or more of the endpoints 178-189 via a communication link, such as an internal or external communication link.

Figure 3:
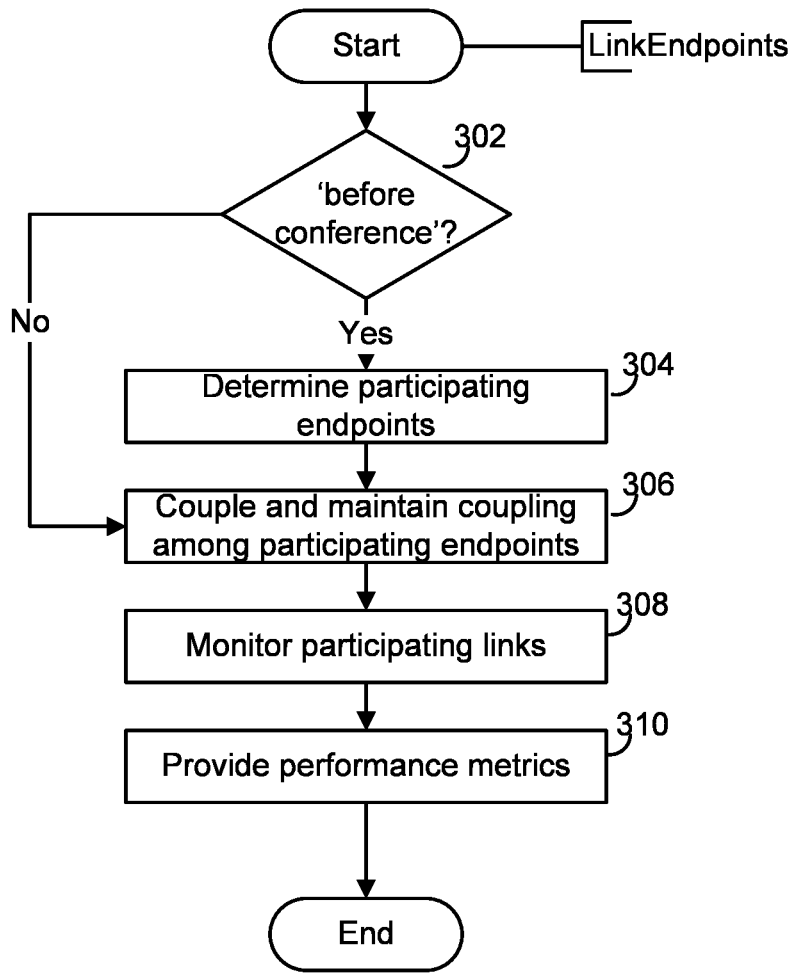
FIG. 3 depicts a flow of operations for the Link-Endpoints function, according to one or more embodiments.

In step 204, the distributed controller 144 within one or more of the endpoints within a cluster matches the state of the conference to one of the conditions, 'before the conference,' 'conference active,' and 'conference completed.' When the condition is 'before the conference,' in step 205, the distributed controller 144 performs the Link-Endpoints function, which is further described in reference to FIG. 3. The process(es) performed by the Link-Endpoints function can include an automated pairing or discovery process that includes the transfer of metadata that includes capability information to other endpoints via an established communication link so that the cluster of endpoints is aware of the capabilities of each of the endpoints within the cluster. At this point, all endpoints capturing the participants are connected and in communication with each other via one or more communication links.

In step 206, the distributed controller 144 within one or more of the endpoints within a cluster performs the Load-Balance function that includes a comparison of the received metadata, which includes the capabilities and current workload information, from a plurality of endpoints within the cluster based on the information received during the Link-Endpoints process, which is described in greater detail below in relation to FIG. 3. At this point, all endpoints have been assigned processing tasks based on their processing capabilities. The processing capabilities, such as the device's capability to perform various tasks and its current workload, can be provided by each endpoint and/or determined by one or more of the endpoints during one or more of the processes performed during Link-Endpoints activities. In such cases, the processing capabilities can be transmitted between endpoints by the use of one or more of the communication links formed between the various endpoints and other related devices.

In step 207, the distributed controller synchronizes a master clock to a time standard, such as the coordinated universal time and date (e.g., a call to time.is/UTC). The time standard information can be transmitted to the endpoints within the transmitted metadata during the processes performed during the Link-Endpoints activities.

In step 208, the distributed controller 144 within one or more of the endpoints within a cluster waits for the conference to begin at the scheduled time based on a master clock synchronized in step 207. In some embodiments, due to the prior knowledge of the scheduled event, the cluster or groups of devices can automatically communicate with each other at about the time the event is to occur to reduce the need for manual control and setup of a video conference, which can reduce errors in establishing connections with other locations within the video conference. The process of automatic communication can cause the video conferencing hardware to wake up and prompt the users to enter the upcoming conference set between one or more locations.

When the condition is 'conference active,' the distributed controller 144 within one or more of the endpoints within a first cluster collects the audio-video information (i.e., audio-video streams) from each participating endpoint in step 210. In step 212, the distributed controller 144 within the first cluster sends the collection of streams to the conference provider.

In step 214, the distributed controller 144 within one or more of the endpoints within a cluster at a location that is configured to receive the video streams sent during step 212, such as a second cluster of endpoints, receives a plurality of individual streams provided from the conference provider in response to the collection of streams sent during step 212. The many streams received by the second cluster may also include metadata that is used by one or more of the endpoints in the second cluster to perform some desired additional processing (e.g., cropping, data upscaling, etc.) of the video data within the streams (e.g., step 216) based on the information provided in the metadata. In one example, the attached metadata may include decoding process instructions that are to be performed by the endpoints within the second cluster based on information gained by each of the endpoints within the first and second clusters during the Link-Endpoints process performed during step 206. In other words, due to the determined capabilities of each of the endpoints during the prior steps, the video stream information generated by and/or provided to each of the endpoints can be further processed based on the knowledge gained about each of the devices within the various clusters to improve the quality of the video conference experience. In one example, further processing can include framing, reframing, zooming, cropping, and encoding of a video and audio stream. However, in some embodiments, a more capable first endpoint may determine that a less capable second endpoint at another video conference location is not able to handle a high-quality video stream (e.g., 4k video) due to the information gained during the Link-Endpoints activity, and then causes a video stream that has a reduced quality (e.g., 1080p video) to be sent to the second endpoint so that the second endpoint can efficiently process the received video stream data and provide the data to recipients in the video conference.

In some embodiments, due to the information gained regarding the capabilities of each of the endpoints within a cluster during the Link-Endpoints activity, the quality of the video streams provided by each of the endpoints can be increased or purposely maintained at a higher than typical quality level set by the conference provider, since each of the devices within the one or more clusters in a video conferencing environment are known to be capable of handling the higher quality video streams. The use of higher-quality video streams within the cluster(s) can be helpful to assure that the quality of the video conference is maintained at all times, such as when certain processing activities are to be performed on the video stream data to be ultimately displayed at the various video conferencing locations. In one example, the processing activities can include cropping and resizing activities performed on the video stream data. In some embodiments, the quality of each video stream provided by each endpoint is provided at the same quality level (e.g., 4k video), and/or the quality is provided at a higher level than required by the conference provider.

In step 216, the distributed controller 144 within the second cluster forms a composition of the many received streams by use of a decoding process. The decoding process can include the video stream information being first received by the distributed controller 144 within one or more of the endpoints, such as an all-in-one endpoint, prior to the video stream data being provided to the conference provider. In this case, based on the received metadata and known capabilities of the receiving endpoint(s), the video stream data can be processed based on the information or instructions provided in the metadata prior to being delivered to the conference provider.

In step 218, the distributed controller 144 within the second cluster sends the composition or composition that was further processed during the decoding process performed during step 216 to one or more of the endpoints within the second cluster for display to attendees of the video conference or further processing. In this manner, the participating endpoints only receive a single stream (a composite stream) and not a large number of individual streams. Receiving a single composite stream reduces the load on the endpoint.

In step 220, the distributed controller 144 within one or more of the endpoints within each cluster monitors the status of each of the endpoints within the cluster and gathers and provides performance metrics for use during at least a portion of the Load-Balance process.

Steps 210-220 are repeated for each collection sent to and each batch of streams received from the conference provider. Steps 210-220 achieve a throughput that matches that of the conference provider. In some embodiments, the load balancing process is performed during the video conference in an effort to improve the quality of the video stream and video conference experience due to an improved ability to process and enhance the video stream data before it is transmitted to and/or displayed at other locations within a video conference. In some embodiments, the endpoints that have additional capabilities to process one or more video streams from another endpoint due to enhanced processing capabilities, reduced workload, or lower private or public network latency receive and process the received video stream data and then send the processed video stream data and any additional video stream data generated by itself at the same time. In some cases, the other endpoint could also simultaneously send out an unprocessed or reduced complexity video stream to a desired video conference location so that the unprocessed video stream can be processed before it is provided to the conference provider running at the location, such as described above during steps 216-218. Alternately, in some embodiments, the endpoints that have additional capabilities, a reduced workload, or lower private or public network latency receive and process the received video stream data and then send the processed video stream data back to the other endpoint device for transmission to the other video conference location.

In some cases, the network latency, or latency of the cluster, may be used to limit or control the functions performed by one or more specific devices within a cluster based on the specific device's inability or inefficiency in performing certain tasks that would add to the overall cluster's latency. The selection of the specific device and functions performed by the device can be governed by the device's capability and/or its current workload. In this case, the specific device may perform only a portion of the processing of a video stream (e.g., portions that it is capable of performing without incurring a latency penalty due to its inefficiency) and then transfers the partially processed video stream to another device for the completion of the processing. In one example, a data processing strategy used by the distributed controller 144 may include the use of a less capable local device that captures a video, does no advanced image processing (e.g., removing a latency increasing task for the less capable device), but crops a specific section of the video based on input received from an advanced remote device (e.g., removing an additional latency increasing task from the less capable device and on other remote devices that would need to perform the task) before transferring the partially processed video to yet another device for the completion of desired processed video (e.g., performing advanced video processing).

In some embodiments, when the condition is 'conference completed,' the distributed controller 144 within one or more of the endpoints within the first cluster and/or second cluster performs the Load-Balance function in step 222 with the performance metrics that were gathered during the conference. The Load-Balance function may re-assign processing tasks among the endpoints during subsequent video conferencing activities depending on the gathered performance metrics. For example, if an endpoint performed poorly, slowing down the conferencing system, the Load-Balance function recognizes this case and moves the load from the low-performing endpoint to a more capable endpoint.

Thus, not only are performance metrics gathered during the conference but the links are monitored via the Link-Endpoints function to determine how the links are performing and whether participants in the conference are still linked. If a link has been lost, the distributed controller 144 attempts to re-establish communication for an endpoint. For example, the distributed controller 144 may attempt to find a different path in the local network to the lost endpoint. Alternatively, if an endpoint or endpoints are shut down so that participants can move to a different location (e.g., a different conference room), the distributed controller 144 finds a network path to the endpoint in the different location. In step 220, after the conference, the distributed controller 144 may re-distribute processing functions over the endpoints based on each participating endpoint's gathered performance metrics and capabilities.

FIG. 3 depicts a flow of operations for the Link-Endpoints function, in an embodiment. When called, the function in step 302 determines whether the condition is 'before the conference.' If so, the distributed controller 144 determines in step 304 the endpoints participating in the conference and their capabilities. During the process of determining which endpoints are participating in the conference, each endpoint transmits capability information within metadata to at least one other endpoint so that the transmitted information can be used by the receiving endpoint and/or transmitted to other endpoints within the location so that one or more of the endpoints within a cluster is aware of the capabilities of each of the endpoints within the cluster. In some embodiments, the capability information provided by each of the endpoint devices includes firmware status information (e.g., current software revision information), hardware information (e.g., model type, hardware capability information, etc.), and optionally serial number information (e.g., information relating to hardware and software revision date when shipped), which is used by the receiving endpoint device to determine an endpoint's capability.

Steps 304-310 are run regardless of the condition of the conference. In step 306, the distributed controller 144 within one or more of the endpoints within a cluster connects and maintains connection among the participating endpoints to facilitate communication among each other and to the conference provider. The connection may occur partially over a local wired or wireless network via communication links 112, 114, 132, 134, as depicted in FIG. 1C or FIG. 1D and partially via the conference provider and the cloud 110. In some embodiments, the metadata embedded within the video stream is created in such a way to prevent the conference provider from altering or stripping the metadata from the video stream transmission. In one example, the metadata is provided in a header within one or more sequential frames of a video stream. In another example, the metadata is provided in an audio packet of a video stream at an audio frequency that is outside of the normal human audible range and within the frequency range set by the conferencing provider. In yet another example, the distributed controller 144 is configured to add an icon or region within a frame (e.g., group of pixels within a frame) of a video stream that includes metadata information that is used by the other connected endpoints. In one example, the distributed controller 144 takes over specific pixels in a video stream to transfer the desired metadata during one or more parts of a video conference (e.g., startup of the video conference). In some cases, the initial "handshake" can even transfer a QR code that is embedded into a video stream for a first period of time (e.g., 0.1 to 60 seconds). The QR code can be used by the receiving device or user to retrieve metadata or other useful information from an internal or external database.

In some embodiments, in step 306, edge devices connect and maintain connection among participating endpoints without the aid of the conference provider. For example, endpoints 184, 186 operate as edge devices that connect geographically different locations (Location 1, Location 2) using only the cloud (i.e., a public network such as the Internet). One of the endpoints is designated by the distributed controller as the device for connecting to the conference provider via the cloud on behalf of all connected and participating endpoints. In these embodiments, no metadata is embedded in the video stream or audio stream to or from the conference provider.

In step 308, a function within the distributed controller 144 monitors the participating links for activity to make sure that they are performing according to their capabilities and to re-establish communication if endpoints have been shut down in favor of different endpoints. In addition, monitoring the links lets the function know whether a link has failed and communication has to be re-established. The process of monitoring links generally includes the regular transmission of workload information and/or capability information at desired intervals by each of the endpoints in each cluster. The transferred information can be provided in the metadata transferred via direct communications between the various endpoints and/or within the video streams transmitted between the various endpoints. In some embodiments, the designated edge device acting on behalf of all of the participating endpoints monitors the participating links and re-establishes communication if endpoints have been shut down.

In step 310, the function within the distributed controller 144 gathers performance metrics on a real-time basis from the endpoints during the process monitoring step to provide those metrics to the Load-Balance function. Such metrics can include the throughput, CPU utilization, response time, channel capacity, completion time, bandwidth, relative efficiency, compression ratio, and latency of the endpoints in sending and receiving the audio-video streams and the utilization of the processing capabilities of the endpoints. In some embodiments, the information passed between devices can include: 1) hardware information (e.g., device model generation (e.g., processor generation), memory configuration, etc.), 2) software and firmware version, and 3) any additional cameras, or accessories attached to the device that would require more computational resources locally.

Figure 4:
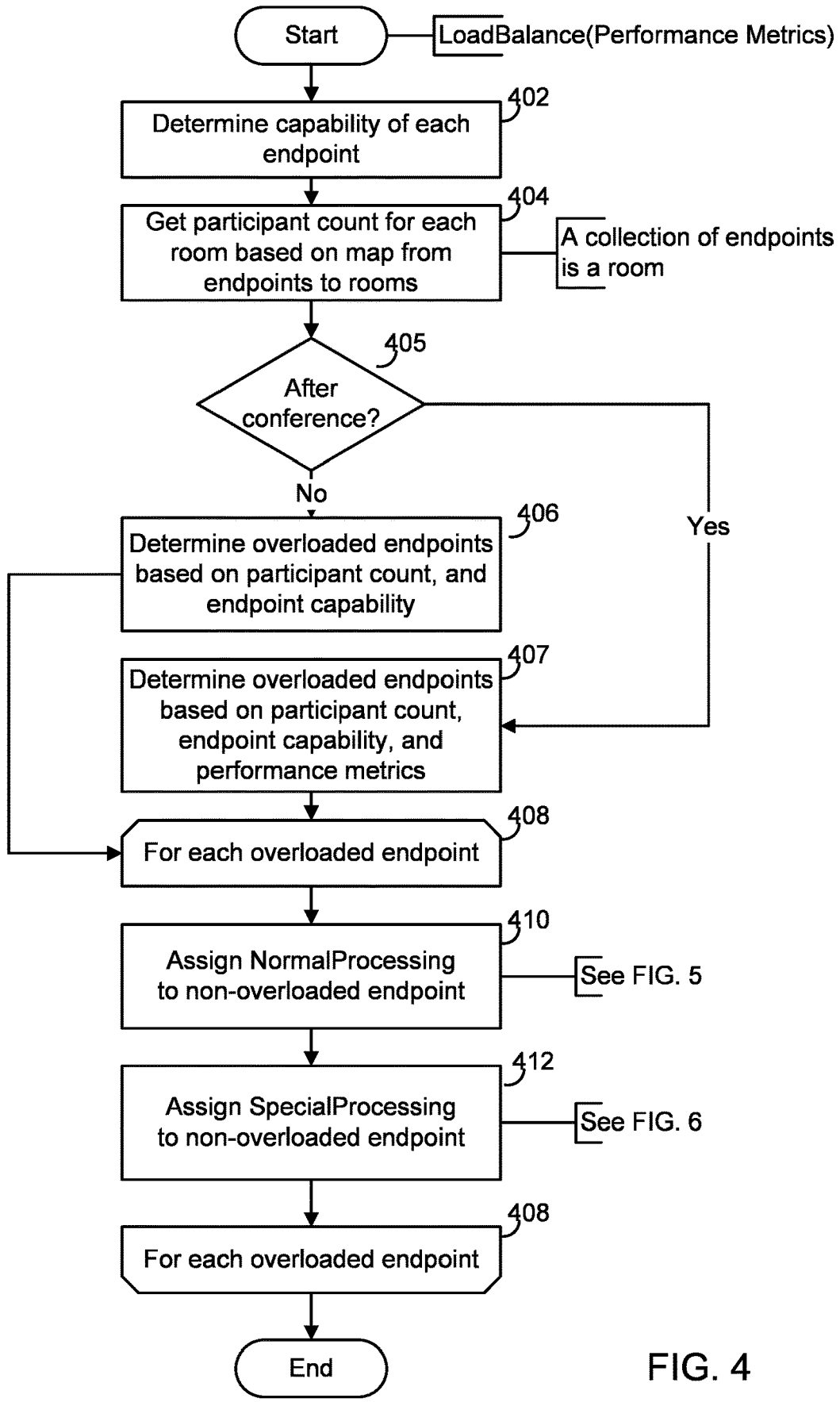
FIG. 4 depicts a flow of operations for a Load-Balance function, according to one or more embodiments.

FIG. 4 depicts a flow of operations for a Load-Balance function, in an embodiment. In step 402, the function within the distributed controller 144 determines the capability of each endpoint. Some endpoints have greater capabilities than other endpoints due to the status of the software and/or hardware within an endpoint. The capabilities may be determined by comparing received capability information with device information stored in memory. In one example, the device information can be stored in memory based on or cross-referenced by model type or serial number information. The hardware status includes generation information of the hardware platform, the processor type, and the memory configuration and can be expressed as a code name that is used in the metadata. A performance index number can account for any additional camera and accessories included in the hardware platform that would require more compute resources. Software status includes a software version and firmware version.

Based on the Load-Balance function's analysis discussed below, the Load-Balance function is used to determine and cause the more capable endpoints within a cluster to balance the bandwidth and processing load by, for example, performing framing, zooming, cropping, and encoding of a video and audio stream, while less capable or overworked endpoints cannot.

In step 404, the Load-Balance function within the distributed controller 144 optionally gets a participant count for each room using a mapping from endpoints to rooms. The participant count can be used to provide an indication of the load at each endpoint within a cluster.

At step 406, the Load-Balance function determines which endpoints have a load that exceeds their processing capabilities (i.e., is overloaded) and makes adjustments to balance loads of the endpoints. If the conference has not completed, as determined in step 405, the load of the endpoint is determined in step 406 based on the participant count, the received performance metrics, and the endpoint capability. If the video conference has completed, the load of the endpoint is determined in step 407 based on the performance metrics gathered during the conference and/or endpoint capability. During step 410, the Load-Balance function assigns a Normal-Processing function (FIG. 5) or a Special-Processing function (FIG. 6) to a non-overloaded endpoint or each overloaded endpoint, respectively, according to step 408. In step 412, the Load-Balance function assigns the Special-Processing function to an endpoint that can handle the processing load for performing additional processing above their current workload and/or more complex processing functions. For example, if the function determines that an endpoint is not a highly capable endpoint (i.e., one with limited capabilities) and that the endpoint is capable of normal processing, then only normal processing is assigned to the endpoint. In some embodiments, the normal processing is assigned with restrictions. For example, the endpoint is instructed to perform normal processing but at a reduced resolution of the video stream (i.e., 1K instead of 4K) because its capabilities are better suited to the reduced resolution. If the endpoint is not capable of even normal processing, then its processing is assigned to another endpoint that performs the normal processing for that endpoint as well as for itself. Because the endpoints within a cluster are all in communication with each other and thus know each other's capabilities and workload, the processing assignment determined by the Load-Balancing function can optimize the processing tasks of each of the endpoints in the one or more of the clusters. However, if the endpoint has the resources for performing additional processing above its current workload and/or complex functions, then the function assigns the Special-Processing function to the more capable endpoint. After these assignments are made, the endpoints perform the functions according to the assignments.

Figure 5:
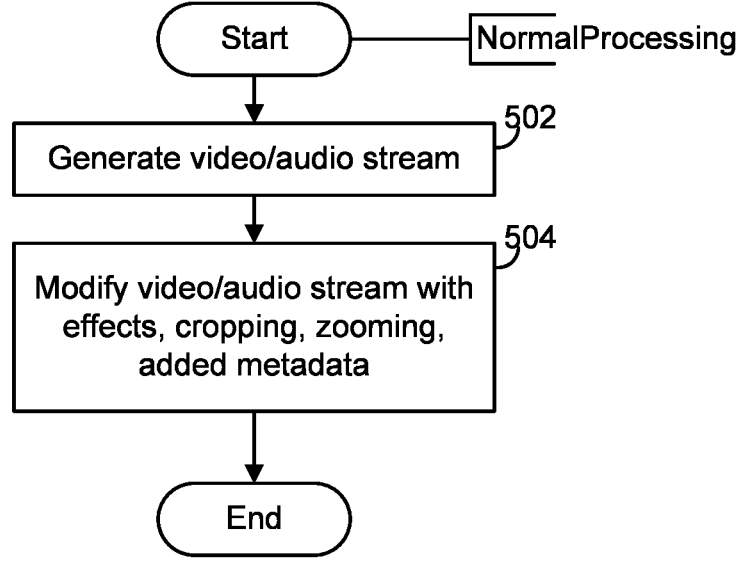
FIG. 5 depicts a flow of operations for a Normal-Processing function, according to one or more embodiments.

FIG. 5 depicts a flow of operations for a Normal-Processing function, in an embodiment. The function operates in an assigned endpoint and generates in step 502 a video/audio stream for an endpoint. The function can be used to modify in step 504 the video/audio stream by adding effects, cropping, zooming, latency, encoding the stream, and attaching high-level, possibly declarative, metadata to the stream, where the high-level metadata specifies the effects, cropping, zooming, latency, and encoding of each participant covered by the endpoint camera system. Thus, the function creates a stream for the assigned endpoint or endpoints (if the endpoint is assigned processing for another endpoint) and provides a single stream with metadata to the distributed controller.

Figure 6:
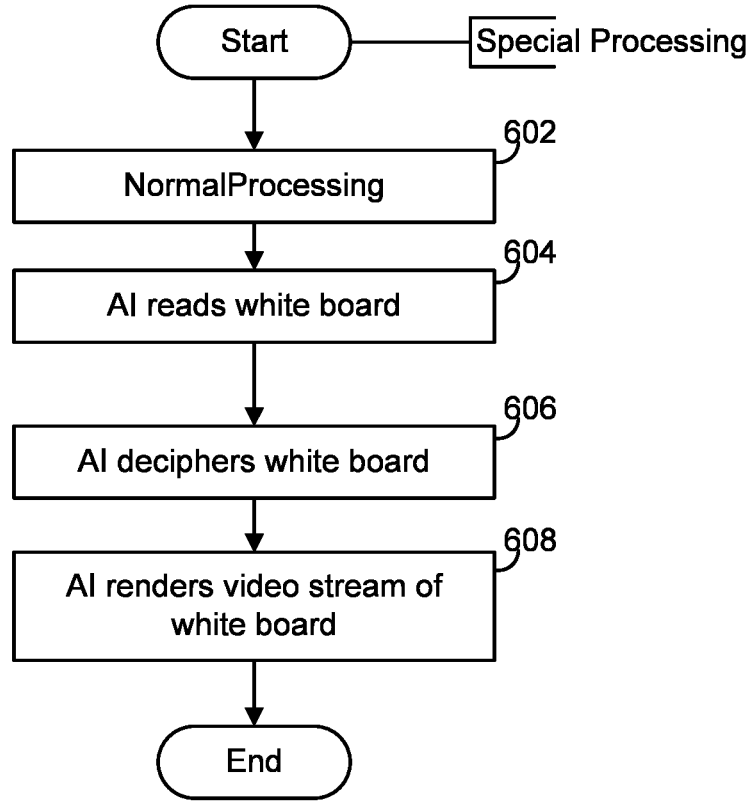
FIG. 6 depicts a flow of operations for a Special-Processing function, according to one or more embodiments.

FIG. 6 depicts a flow of operations for a Special-Processing function, in an embodiment. The Special-Processing function includes the Normal-Processing function, an AI function, and possibly other functions. In step 602, the Normal-Processing function is performed. In step 604, the AI function reads a whiteboard in the conference room having an endpoint, to which the Special Processing function is assigned, deciphers the whiteboard in step 606, and renders a video stream of the whiteboard in step 608, making the video stream available via the network for shared viewing by all of the linked participants.

Figure 7:
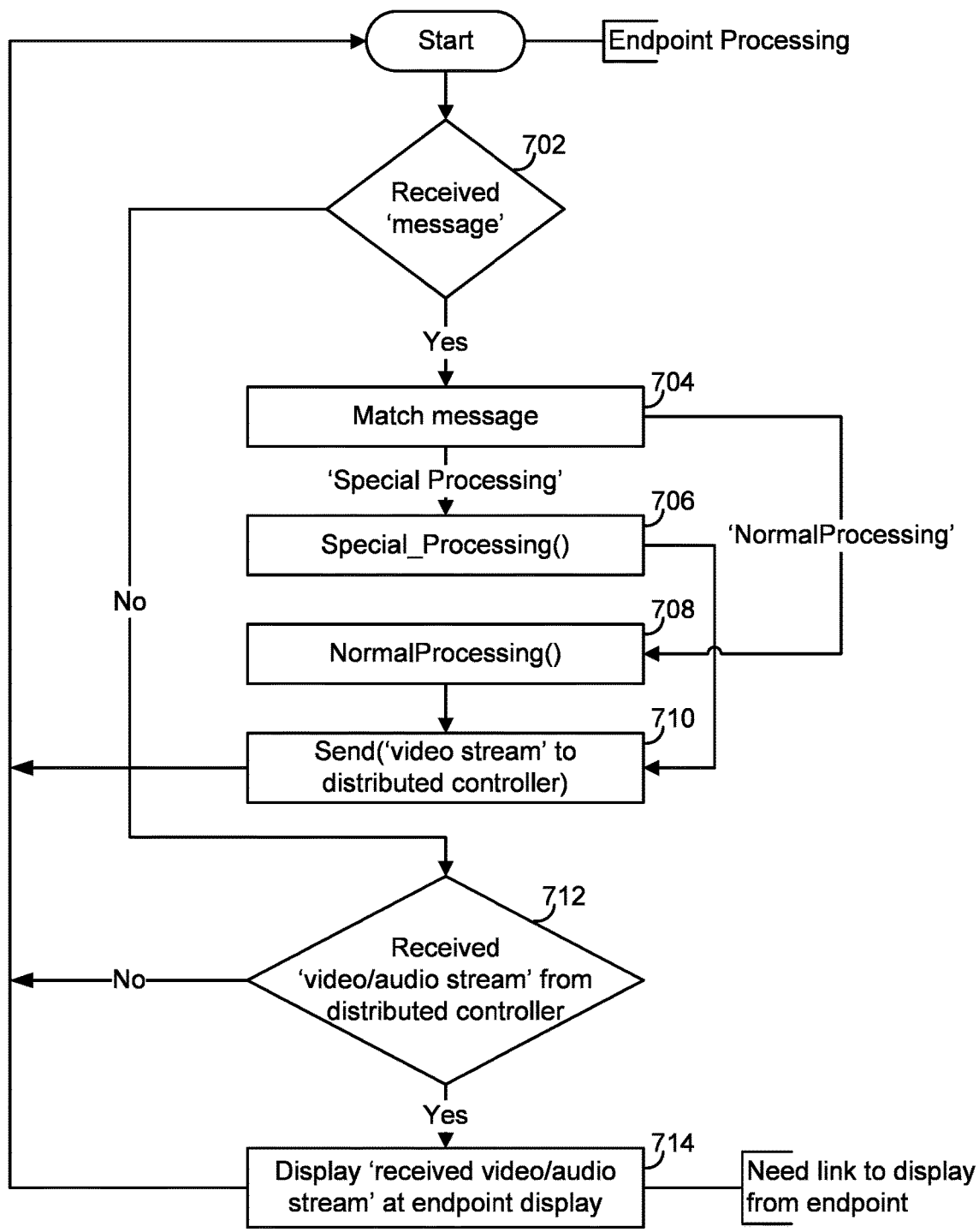
FIG. 7 depicts a flow of operations for an endpoint function, according to one or more embodiments.

FIG. 7 depicts a flow of operations for an endpoint function, in an embodiment. When the endpoint function receives a message in step 702, it is either a 'special processing' message or a 'normal processing message.' If the endpoint function receives in step 704 the 'special processing' message, it performs the Special-Processing function in step 706 using the capabilities of the endpoint running the function. If the endpoint function receives the 'special processing' message in step 704, it performs in step 708 the Normal-Processing function using the capabilities of the endpoint. In step 710, the execution of the function, Normal or special processing, causes the endpoint to send the video stream to the distributed controller 144. If the endpoint function does not receive a message and does receive an audio-video stream composition from the distributed controller 144 in step 712, then the function displays in step 714 the composition video/audio stream at the endpoint. Thus, because the distributed controller 144 has formed a composition of all of the audio-video streams received from the conference provider, individual streams are not received by the endpoint. Composition by the distributed controller 144 reduces each endpoint's processing load and bandwidth requirements. The distributed controller 144 only designates one or more endpoints to perform the composition if the designated endpoints have the capability to do so.

Meeting Control Process Example

In some embodiments, the formation of a cluster of interconnected devices is further configured to improve the setup and control of the video conferencing resources at two or more locations within a cluster of endpoints due to the awareness of the capabilities of each of the endpoints within the cluster gained during the process(es) performed by the Link-Endpoints function discussed above. In some cases, the distributed controller 144 is utilized by one or more of the endpoints within a local video conferencing environment to allow video conference performed in a first conference room to be automatically transferred to and set up in a second conference room based on the knowledge of capabilities of each of the endpoints within the cluster.

In one example, if a video conference running in one location, such as conference room 146 in location 1 in FIG. 1, is forced to end its use of the conference room due to scheduling or other changes in video conference status, one or more of the endpoints in the conference room can receive input from one of the participants in the video conference regarding a wish to continue the video conference in another conference room such as conference room 148. The input received from one of the participants can include input from a video conference participant in conference room 146 or input from a remote conference participant in another conference room (e.g., conference room 150) via metadata provided through a communication link. Based on the input received by one of the endpoints in the cluster, such as endpoint 102 or highly capable endpoint 104 in location 1, the distributed controller 144 within the cluster can then review the various capabilities of the endpoints in each of the local conference rooms to determine if there is a conference room that has an endpoint or endpoints that have similar capabilities to continue the video conference in the new location. During this activity, the distributed controller 144 can also determine, based on the known current status and known capabilities of the endpoints in the cluster, that endpoints at the new location are available and are the right type of endpoint (e.g., video camera, all-in-one, etc.) and they have the right number of endpoints to assure that the video conference can be continued without significant degradation to the video conferencing experience. If no conference room location is available or matches the requirements set by the original meeting's requirements, the distributed controller notifies the video conference participants. If a conference room location is unoccupied and has the desired capabilities, the distributed controller 144 can automatically end the video conference at its initial location and start up the video conference at the new location. The setup at the new location can occur after a desired delay to ensure that the video conference room participants have time to change locations and that the endpoint devices are oriented correctly to capture the video conference environment in the new conference room.

While the foregoing is directed to embodiments of the present disclosure, other and further embodiments of the disclosure may be devised without departing from the basic scope thereof, and the scope thereof is determined by the claims that follow.

What is claimed is:

1. A method of conducting a video conference, the method comprising:
    receiving, by a first endpoint, endpoint capability information from at least two endpoints within a plurality of endpoints that are participating in the video conference, wherein each of the at least two endpoints is in communication with the other of the at least two endpoints within the plurality of endpoints, wherein the first endpoint of the plurality of endpoints comprises a distributed controller;
    determining, by the distributed controller, capabilities of at least one endpoint of the at least two endpoints within the plurality of endpoints that are participating in the video conference;
    receiving, by the first endpoint of the at least two endpoints, a plurality of streams of audio-video information of at least a portion of the video conference;
    adjusting during the video conference, by the first endpoint, the audio-video information based on the determined capabilities of the at least one endpoint of the at least two endpoints based on the received endpoint capability information;
    sending, by the first endpoint, the adjusted audio-video information to a conference provider;
    receiving, by one or more endpoints of the plurality of endpoints, the adjusted audio-video information from the conference provider; and
    transmitting, by the one or more endpoints of the plurality of endpoints, the adjusted audio-video information received from the conference provider to an endpoint within the plurality of endpoints that are participating in the video conference.

2. The method of claim 1, wherein each endpoint of the at least two endpoints is in communication with the other endpoint of the at least two endpoints by:
    connecting the plurality of endpoints physically near each other with point-to-point links; and
    connecting the first endpoint to the conference provider via a public network.

3. The method of claim 1, wherein each endpoint of the at least two endpoints is in communication with the other endpoints of the at least two endpoints by:
    connecting endpoints physically near each other with wired or wireless networks; and
    connecting the first endpoint to the conference provider via a public network.

4. The method of claim 1, further comprising forming a composition of the audio-video information received from the conference provider by converting the received adjusted audio-video information into a single stream having a plurality of portions, one for each of the plurality of streams.

5. The method of claim 1,
    further comprising gathering performance metrics from the at least one endpoint of the at least two endpoints;
    wherein the performance metrics include bandwidth and processing load on the at least one endpoint of the at least two endpoints.

6. The method of claim 1, wherein the received audio-video information being adjusted based on the determined capabilities includes the first endpoint performing an adjustment for itself and at least one other endpoint of the plurality of endpoints.

7. The method of claim 1, further comprising, during the video conference:
    monitoring the communication of one or more endpoints of the plurality of endpoints to discover that the one or more endpoints of the plurality of endpoints is disconnected from the video conference; and
    re-establishing the monitored communication to the one or more endpoints of the plurality of endpoints to reconnect them to the video conference.

8. The method of claim 1, wherein the first endpoint comprises one of a camera device, a camera, and a microphone device.

9. The method of claim 1, wherein the first endpoint comprises one of a wide-angle camera device, a pan and tilt camera device, and a microphone.

10. The method of claim 1, wherein the first endpoint comprises one of a television, a monitor, a projection screen, a laptop, a personal computer, a tablet, a smartphone, and a whiteboard.

11. A system for performing a video conference, the system comprising:
    a plurality of endpoints; and a distributed controller formed and run by at least two endpoints of the plurality of endpoints, wherein the distributed controller is configured to:
receive, by the distributed controller, endpoint capability information from each of the endpoints of the at least two endpoints within the plurality of endpoints that are participating in the video conference, wherein each endpoint of the at least two endpoints in the plurality of endpoints is in communication with the other endpoints within the at least two endpoints in the plurality of endpoints;
determine, by the distributed controller, capabilities of at least one endpoint of the at least two endpoints in the plurality of endpoints that are participating in the video conference;
receive, by the distributed controller, a plurality of streams of audio-video information of at least a portion of the video conference, the audio-video information being adjusted during the video conference based on the determined capabilities of the at least one endpoint of the at least two endpoints in the plurality of endpoints based on the received endpoint capability information;
send the adjusted audio-video information to a conference provider;
receive the adjusted audio-video information from the conference provider; and
transmit the adjusted audio-video information received from the conference provider to an endpoint within the at least two endpoints in the plurality of endpoints that are participating in the video conference.

12. The system of claim 11, wherein each endpoint of the at least two endpoints is in communication with the other endpoints of the at least two endpoints by the distributed controller being configured to:
connect the plurality of endpoints physically near each other with point-to-point links; and
connect the at least one endpoint to the conference provider via a public network.

13. The system of claim 11, wherein each endpoint of the at least two endpoints is in communication with the other endpoints of the at least two endpoints by the distributed controller being configured to:
connect endpoints physically near each other with wired or wireless networks; and
connect at least one endpoint to the conference provider via a public network.

14. The system of claim 11, wherein the distributed controller is further configured to form a composition of the audio-video information received from the conference provider by converting the received adjusted audio-video information into a single stream having a plurality of portions, one for each of the plurality of streams.

15. The system of claim 11,
wherein the distributed controller is further configured to gather performance metrics from each of the participating endpoints of the at least two endpoints in the plurality of endpoints;
wherein the performance metrics include bandwidth and processing load on each participating endpoint of the at least two endpoints in the plurality of endpoints.

16. The system of claim 11, wherein the received audio-video information being adjusted based on the determined capabilities includes an endpoint of the two endpoints of the plurality of endpoints performing an adjustment for itself and another endpoint of the plurality of endpoints.

17. The system of claim 11, wherein the distributed controller is further configured to, during the video conference:
monitor the communication of one or more participating endpoints of the at least two endpoints in the plurality of endpoints to discover that the one or more participating endpoints of the at least two endpoints in the plurality of endpoints is disconnected from the video conference; and
re-establish the monitored communication to the one or more participating endpoints of the at least two endpoints in the plurality of endpoints to reconnect them to the video conference.

18. A non-transitory computer-readable medium encoding instructions, which, when executed by processors of a distributed controller within one or more endpoints within a plurality of endpoints that are participating in a video conference, cause the distributed controller to:
receive endpoint capability information from each endpoint of at least two endpoints within a plurality of endpoints that are participating in the video conference, wherein each of the endpoints of the at least two endpoints in the plurality of endpoints is in communication with the other endpoints of the at least two endpoints within the plurality of endpoints;
determine capabilities of at least one endpoint of the of the at least two endpoints in the plurality of endpoints that are participating in the video conference;
receive, by the at least one endpoint of the at least two endpoints of the plurality of endpoints, a plurality of streams of audio-video information of at least a portion of the video conference, the audio-video information being adjusted during the video conference based on the determined capabilities of the at least endpoint one of the at least two endpoints of the plurality of endpoints based on the received endpoint capability information;
send the adjusted audio-video information to a conference provider;
receive the adjusted audio-video information from the conference provider; and
transmit the adjusted audio-video information received from the conference provider to an endpoint of the at least two endpoints within the plurality of endpoints that are participating in the video conference.

19. The non-transitory computer-readable medium of claim 18, wherein each of the endpoints of the at least two endpoints in the plurality of endpoints is in communication with the other endpoints of the at least two endpoints in the plurality of endpoints by instructions causing the distributed controller to connect endpoints physically near each other with point-to-point links and to connect at least one endpoint to the conference provider via a public network.

20. The non-transitory computer-readable medium of claim 18, wherein each of the endpoints of the at least two endpoints in the plurality of endpoints is in communication with the other endpoints of the at least two endpoints in the plurality of endpoints by instructions causing the distributed controller to connect endpoints physically near each other with wired or wireless networks and to connect at least one endpoint to the conference provider via a public network.

21. The non-transitory computer-readable medium of claim 18, wherein the instructions further cause the distributed controller to form a composition of the audio-video information received from the conference provider by converting the received audio-video information into a single stream having a plurality of portions, one for each of the plurality of streams.

22. The non-transitory computer-readable medium of claim 18,
wherein the instructions further cause the distributed controller to gather performance metrics from each participating endpoint of the at least two endpoints in the plurality of endpoints;
wherein the performance metrics include bandwidth and processing load on each participating endpoint of the at least two endpoints in the plurality of endpoints.

23. The non-transitory computer-readable medium of claim 18, wherein the audio-video information being adjusted based on the determined capabilities includes the at least one endpoint performing an adjustment for itself and another endpoint of the plurality of endpoints.

* * * * *